US008081565B2

(12) United States Patent
Moore

(10) Patent No.: US 8,081,565 B2
(45) Date of Patent: Dec. 20, 2011

(54) METHOD AND APPARATUS FOR ADAPTIVE CONTROL OF SYSTEM PARAMETERS FOR ADMISSION CONTROL

(75) Inventor: Sean S. B. Moore, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 1111 days.

(21) Appl. No.: 11/111,465

(22) Filed: Apr. 21, 2005

(65) Prior Publication Data

US 2006/0239185 A1   Oct. 26, 2006

(51) Int. Cl.
 *G01R 31/08* (2006.01)
(52) U.S. Cl. ....................... 370/229; 370/252
(58) Field of Classification Search .......... 370/356, 370/493, 261, 466, 395, 468, 469, 471, 230, 370/232, 411, 229, 252; 709/229
See application file for complete search history.

(56) References Cited

U.S. PATENT DOCUMENTS

| | | | | | |
|---|---|---|---|---|---|
| 5,400,226 | A | * | 3/1995 | Hogrefe | 362/517 |
| 5,594,717 | A | * | 1/1997 | Watanabe et al. | 370/232 |
| 5,740,537 | A | * | 4/1998 | Beming et al. | 455/450 |
| 6,385,173 | B1 | | 5/2002 | Lindskog et al. | |
| 6,556,565 | B1 | | 4/2003 | Ward et al. | |
| 7,298,736 | B1 | * | 11/2007 | Matthews | 370/356 |
| 2002/0068576 | A1 | | 6/2002 | Ritzen et al. | |
| 2002/0163887 | A1 | * | 11/2002 | Suni | 370/232 |
| 2002/0181394 | A1 | | 12/2002 | Partain et al. | |
| 2003/0206537 | A1 | | 11/2003 | Choi et al. | |
| 2004/0106405 | A1 | | 6/2004 | Gabriel et al. | |
| 2005/0052992 | A1 | | 3/2005 | Cloonan et al. | |
| 2005/0083912 | A1 | * | 4/2005 | Afshar et al. | 370/352 |
| 2006/0072522 | A1 | | 4/2006 | Chandra et al. | |
| 2006/0093094 | A1 | * | 5/2006 | Xing et al. | 379/1.02 |
| 2006/0209873 | A1 | * | 9/2006 | Knabchen et al. | 370/443 |

FOREIGN PATENT DOCUMENTS

WO   WO 02/067619 A2   8/2002

OTHER PUBLICATIONS

Tao, et al., "Improving VoIP Quality Through Path Switching," IEEE INFOCOM 2005, www.seas.upenn.edu/~shutao/paper/infocom05.pdf.
Casetti et al., "An Adaptive Algorithm for Measurement-based Admission Control in Integrated Services Packet Networks," Computer Communications, Elsevier Science Publishers BV, Amsterdam, NL, vol. 23, No. 14-15, pp. 1363-1376 (Aug. 2000).
Szabó, István, "Performance Evaluation of a New End-to-End Measurement Base Call Admission Control Scheme for Supporting IP Telephony," Proceedings of the Symposium of Perfomance Evaluation of Computer and Telecommunication Systems, pp. 498-505 (Jul. 2001).
Jiang et al., "Measurement-Based Admission Control: A Revisit", "http://www.q2s.ntnu.no/publications/open/2004/Paper__non__rev/2004_jiang_MBA.pdf", 2004, Publisher: Norwegian University of Science and Technology NTNU, Published in: NO.
Oveissi, David M., "U.S. Appl. No. 11/111,464 Notice of Allowance Dec. 3, 2009", Publisher: USPTO, Published in: US.
Oveissi, David M., "U.S. Appl. No. 11/111,464 Office Action Nov. 25, 2008", Publisher: USPTO, Published in: US.
Oveissi, David M., "U.S. Appl. No. 11/111,464 Office Action Apr. 9, 2008", Publisher: USPTO, Published in: US.
Oveissi, David M., "U.S. Appl. No. 11/111,464 Office Action Aug. 18, 2009", Publisher: USPTO, Published in: US.
"EP Application No. 06 251 651.3 Office Action Jul. 7, 2008", Publisher: EPO, Published in: EP.

* cited by examiner

*Primary Examiner* — Ricky Ngo
*Assistant Examiner* — David Oveissi

(57) ABSTRACT

Methods and apparatus are provided for improving an admission control system using feedback control techniques based on a system performance measure. Generally, one or more performance metrics, such as system output error measurements, are fed back into the admission control system to adjust one or more system parameters and thereby improve the overall performance (e.g., reduce the error measurement). For admission control, one or more performance predictors are used to evaluate an expected quality of the call. The performance of the predictor is evaluated; and at least one of the one or more parameters is adapted based on the evaluation.

23 Claims, 2 Drawing Sheets

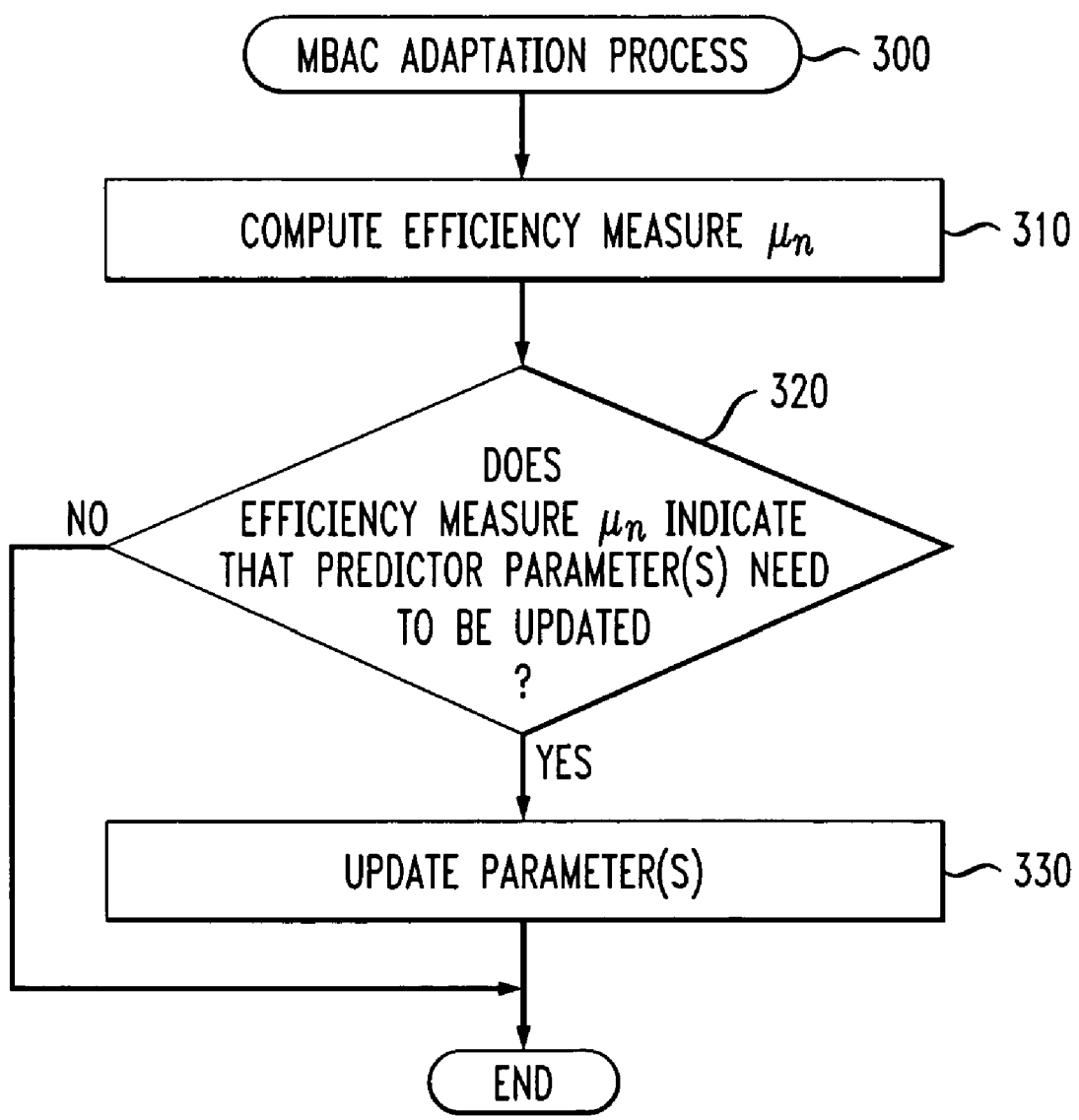

METHOD AND APPARATUS FOR ADAPTIVE CONTROL OF SYSTEM PARAMETERS FOR ADMISSION CONTROL

CROSS-REFERENCE TO RELATED APPLICATION

The present application is related to U.S. patent application Ser. No. 11/111,464, entitled "Method and Apparatus for Quality of Service-Based Admission Control," filed contemporaneously herewith and incorporated by reference herein.

FIELD OF THE INVENTION

The present invention relates generally to communication methods and systems, and more particularly, to methods and systems for admission control in a packet-switched network.

BACKGROUND OF THE INVENTION

Generally, the Internet Protocol (IP) protocol and IP networks have been designed to support a single, best-effort class of service. IP networks have successfully transported TCP-mediated data traffic. As a result, there is a convergence effort to migrate all networked applications, such as voice and videoconferencing applications, to use IP networks as the common transport medium. Best-effort service, however, is not sufficient to meet the Quality-of-Service (QoS) needs of these next-generation applications, especially in an enterprise environment.

A challenging problem for IP networks is efficient admission control (AC). Admission control is required, for example, to support QoS for many inelastic applications. A number of techniques have been proposed or suggested for admission control in packet-switched networks. For example, resource-based admission control (RBAC) methods reserve sufficient network resources for an application on a per-flow basis to handle specified peak bandwidth needs. While generally providing guaranteed QoS, RBAC techniques ignore statistical multiplexing and are therefore inefficient in the sense that additional flows could typically be admitted without experiencing QoS degradation.

More recently, measurement-based admission control (MBAC) methods have been proposed that learn the statistics of network traffic by making on-line measurements. In addition to improving the number of calls supported within a given bandwidth, when compared to RBAC methods, MBAC methods require simpler traffic specifications and are simpler to analyze and design. MBAC methods may be categorized as passive, active, or hybrid techniques. Passive MBAC techniques measure statistics of actual bearer (non-synthetic) traffic. Active MBAC techniques probe the network with synthetic traffic. Hybrid methods combine passive and active methods to improve accuracy and reduce active traffic loads.

While existing MBAC techniques exhibit improved efficiency, by admitting a greater number of calls before unnecessary blocking is experienced, they suffer from a number of limitations, which if overcome, could further improve the utility and efficiency of admission control techniques in packet networks, such as IP networks. For example, such MBAC techniques are static, in the sense that, once configured, the admission control algorithm accepts or rejects a call based on current network conditions relative to fixed criteria. A need therefore exists for adaptive methods and apparatus for admission control. A further need exists for methods and apparatus for admission control that adjust one or more system parameters based on a performance metric.

SUMMARY OF THE INVENTION

Generally, methods and apparatus are provided for improving an admission control system using feedback control techniques based on a system performance measure. Generally, one or more performance metrics, such as system output error measurements, are fed back into the admission control system to adjust one or more system parameters and thereby improve the overall performance (e.g., reduce the error measurement).

For admission control, one or more performance predictors are used to evaluate an expected quality of the call. The one or more performance predictors are based on one or more parameters. The predictor algorithm logic may use, for example, input measurement data, weighting variables, initial conditions, time-based variables and parameter values associated with the requesting call (such as bandwidth), in computing its prediction. According to the present invention, the performance of the predictor is evaluated; and at least one of the one or more parameters is adapted based on the evaluation. For example, a performance metric can be monitored that evaluates for each admission control request whether a given call was accepted and whether the given call would have had a quality that satisfied predefined criteria.

In one exemplary implementation, the best window size for historical data is selected from a set of discrete window sizes. At any time, the admission control system selects one window size for historical data. For each window size in the set, an efficiency measure $\mu_n$ is continually computed. If the efficiency measure for one of the unselected window sizes becomes better than the efficiency measure for the currently selected window size, then the admission control system will switch to the new best window size. In further exemplary variations, the adapted parameters includes one or more weight values associated with parameters for a computed MOS value; a weight given to recent samples relative to historical data; or a weight that is applied a load of a call requesting admission.

A more complete understanding of the present invention, as well as further features and advantages of the present invention, will be obtained by reference to the following detailed description and drawings.

BRIEF DESCRIPTION OF THE DRAWINGS

FIG. 3 is a flow chart describing an exemplary admission control adaptation process incorporating features of the present invention.

DETAILED DESCRIPTION

The present invention employs a system performance measure and feedback to automatically improve an admission control system. Generally, one or more performance metrics, such as system output error measurements, are fed back into the admission control system to adjust one or more system parameters and thereby improve the overall performance (e.g., reduce the error measurement).

Figure 1:
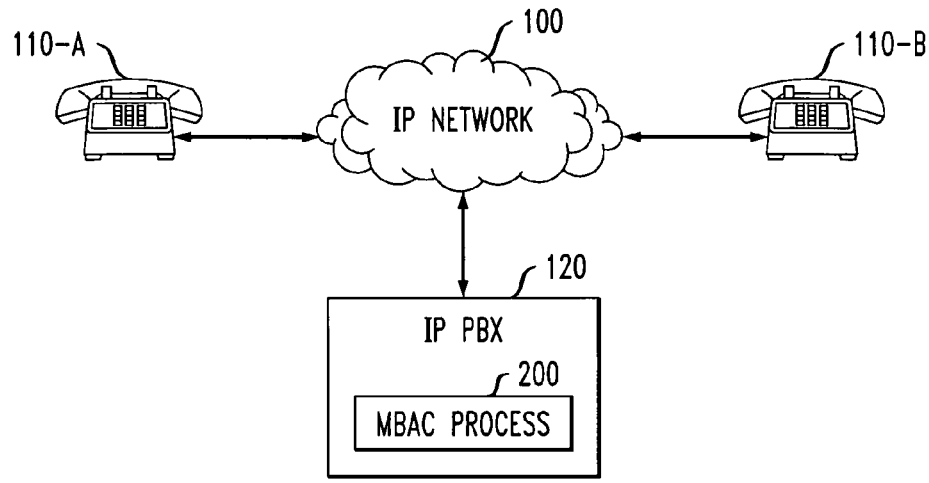
FIG. 1 illustrates a network environment in which the present invention can operate.
Figure 2:
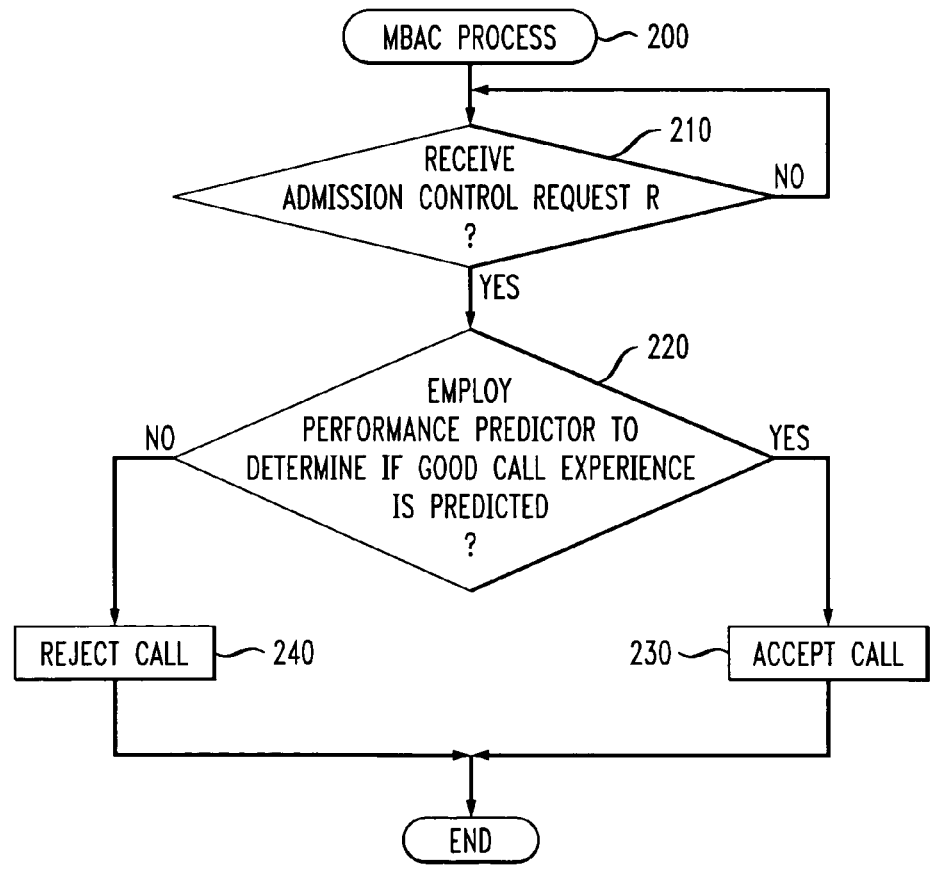
FIG. 2 is a flow chart describing an exemplary admission control process.

FIG. 1 is a block diagram of a network environment in which the present invention can operate. As shown in FIG. 1, two or more endpoints, such as endpoints 110-A and 110-B, attempt to establish a session, such as a VoIP session, over an IP network 100. An MBAC process 200, discussed further below in conjunction with FIG. 2, provides an admission control function in accordance with the present invention. In the exemplary enterprise implementation shown in FIG. 1, the MBAC process 200 resides on an IP private branch exchange (PBX) 120, such as the Avaya Communications Manager™, commercially available from Avaya, Inc. of Basking Ridge, N.J. In further variations, the MBAC process 200 can be implemented as a network service and reside on any node or host in the network 100, as would be apparent to a person of ordinary skill in the art. The network service would serve clients, such as an IP PBX 120. It is noted that the network 100 may be embodied as any combination of public or private, wired or wireless networks, as would be apparent to a person of ordinary skill in the art.

MBAC Admission Control

Consider a call admission control request for a call that will traverse some path in the network 100. For each request, the MBAC system must decide whether to admit or reject the call. Because the future is not known, the admission decision will predict the future path performance using the path's historical performance data. This historical data may be of many types, but for illustration purposes, the historical performance data is assumed to consist of estimated "Mean Opinion Score", or "MOS", such as may be computed using the E-model described in "The E-model, a Computational Model for Use in Transmission Planning," ITU-T Recommendation G.107, March 2003, or other similar MOS-like scores.

Conventional MOS scoring algorithms were intended to be used for estimating the quality of VoIP calls. For admission control across a path in a network, we take the perspective that a MOS or MOS-like score rates the performance of the path, i.e., the path's ability to transport an application session while meeting the application's QoS requirements; hereinafter referred to as the "pathMOS." To incorporate other applications or environments for which such a pathMOS score is not a good measure of application performance, the proposed MBAC algorithm is readily adapted to other applications by simply using an appropriate path QoS/performance scoring algorithm, as would be apparent to a person of ordinary skill in the art.

Generally, an MBAC decision algorithm admits a call if a good call experience is predicted, based on the predicted performance. The challenge is to accurately predict whether or not the call seeking admission will have a good or bad call experience, based, for example, on one or more predefined criteria or thresholds.

A threshold value θ can be defined for the pathMOS score, as follows: If pathMOS exceeds θ, then calls on the path receive acceptable QoS and the experience will be "good;" otherwise, calls receive unacceptable QoS and the experience will be "bad." Hence, in this exemplary model, the MBAC algorithm will admit a call if the algorithm predicts that pathMOS will be greater than or equal to θ during the lifetime of the call, the duration of which is called the call holding time. Otherwise, the admission is rejected. It is noted that the pathMOS score can be measured for a subset of all possible paths between endpoints 110, i.e., because it is possible to select one path from among a subset of possible paths between a pair of endpoints, it may be desirable to compute pathMOS for all paths in the subset and select the one with the best pathMOS score for transporting session data. If a pathMOS score is not available for a desired path, the admission control request can be processed in a conventional manner (or a measurement can be performed as part of the admission control request, e.g., on-demand measurement).

MBAC Algorithm Performance Measurements

As previously indicated, an MBAC decision algorithm admits a call if a good call experience is predicted, based on the predicted performance. FIG. 2 is a flow chart describing an exemplary implementation of an MBAC process 200. As shown in FIG. 2, the MBAC process 200 is initiated during step 210 when an admission control request R arrives. A test is performed during step 220 to determine if a good experience is predicted for the call. If it is determined during step 220 that a good experience is predicted for the call, then the call is admitted during step 230. If, however, it is determined during step 220 that a good experience is not predicted for the call, then the call is rejected during step 240.

The challenge during step 220 is to accurately predict whether or not the call seeking admission will have a good or bad call experience, based, for example, on one or more predefined criteria or thresholds. The manner in which the predicted performance predictor is computed determines the output of the admission control system. The present invention recognizes that the performance predictor can be improved using a feedback control system.

According to one aspect of the invention, an efficiency measure $\mu_n$, discussed hereinafter, indicates whether or not the predicted performance predictor is working well. The predictor algorithm logic may use, for example, input measurement data, weighting variables, initial conditions, time-based variables and parameter values associated with the requesting call (such as bandwidth), in computing its prediction. All of these variables may be modified or weighted in order to change the result of the predictor, and therefore the result of the admission control and its efficiency/error measurements. Such changes can depend on the efficiency/error measurement that is fed back into the admission control system.

FIG. 3 is a flow chart describing an exemplary implementation of an MBAC adaptation process 300 incorporating features of the present invention. It is noted that the MBAC adaptation process 300 may be implemented continuously, at predefined intervals or upon each n implementations of the MBAC process 200 to process admission control requests (where n is a configurable parameter). As shown in FIG. 3, the MBAC adaptation process 300 initially computes the efficiency measure $\mu_n$ during step 310. A test is performed during step 320 to determine if the efficiency measure $\mu_n$ indicates that one or more predictor parameters need to be updated, based on one or more predefined criteria. If it is determined during step 320 that one or more predictor parameters need to be updated, the update is performed during step 330. Otherwise, program control terminates.

In a number of exemplary implementations discussed further below, feedback techniques are employed to adaptively update the window size for historical data, or adaptively weight various parameters used to compute a MOS value, historical data or the call load. For example, in one implementation, the best window size for historical data is selected from a set of discrete window sizes. At any time, the admission control system selects one window size for historical data. For each window size in the set, the efficiency measure $\mu_n$ is continually computed during step 310. If it is determined during step 320 that the efficiency measure for one of the unselected window sizes become better than the efficiency measure for the currently selected window size, then the admission control system will switch to the new best window size.

Consider the sequence of call admission control requests, indexed as j=1, 2, ..., for a given path. Define a parameter $A_j \in \{0,1\}$ associated with the $j^{th}$ call admission control request, where $$A_j = 0 \text{ if((admitted but had a bad experience) OR} \quad (1)$$
$$\text{(rejected and would have had a bad experience))}$$
$$= 1 \text{ if((admitted but had a bad experience) OR}$$
$$\text{(rejected but would have had a bad experience))}$$

For concreteness, if a simple predictive model is used that predicts the call experience from the current pathMOS score (i.e., the predicted quality of the call for the entire call duration is based on a measure (pathMOS) of the performance of the path the call will traverse at the time of the admission request), then:

$$A_j = 0 \text{ if } pathMOS < \theta \text{ when the } j^{th} \quad (2)$$
$$\text{admission request is made}$$
$$= 1 \text{ if } pathMOS \geq \theta \text{ when the } j^{th}$$
$$\text{admission request is made}$$

Define a parameter $\hat{A}_j \in \{0,1\}$ that indicates whether or not a call is admitted, as follows:

$$\hat{A}_j = 0 \text{ if the } j^{th} \text{ admission request is rejected} \quad (3)$$
$$= 1 \text{ if the } j^{th} \text{ admission request is accepted}$$

The performance, or efficiency, of an MBAC algorithm can be measured, for example, as a function of $A_j$ and $\hat{A}_j$. Thus, an exemplary efficiency measure $\mu_n$ is defined as $$\mu_n = 1 - \frac{1}{n}\sum_{j=1}^{n}|\hat{A}_j - A_j|, \quad (4)$$

and scores the performance of the MBAC algorithm after processing n admission control requests. If the algorithm makes the right decision every time, then $\mu_n$ equals 1, or 100%; if it makes the wrong decision every time, then $\mu_n$ equals 0.

Equation (4) may be impractical to use in a deployed system because of timeliness issues, among others. Determining a call experience should be done after a call is completed, but some calls may last for hours. In addition, the call experience that would have occurred for a rejected call cannot be determined. In practice, approximations may need to be made. As discussed in the following section, some exemplary practical approximations are presented, and an example of how these approximate measures can be used is described in which the efficiency measure is used to adaptively compute the best window size for historical data for predicting future pathMOS.

Adaptive Update of Window Size for Historical Data

In a path switching context, S. Tao et al., "Improving VoIP Quality Through Path Switching," to appear in IEEE INFOCOM, and downloadable from http://einstein.seas.upenn.edu/mnlab/papers/Tao_infocom05.pdf, uses historical performance data for a set of paths to determine which path currently provides the best transport performance. This scheme adaptively selects the "best" value for the extent of historical data (i.e., the window size) used in the path selection process, depending on which time scale currently results in the best (estimated) performance of the path selection algorithm. In an MBAC context, an exemplary embodiment of the present invention would similarly select the "best" value for the extent of historical data (i.e., the window size) for an MBAC system.

Such an embodiment adaptively selects a best historical data window size $t_h$ from a set of predefined values $\{t_m; m=1, 2, \ldots M\}$. To select $t_m$ values, the present invention uses the equation $t_m = t_u \times 4^{\{m-1\}}$ and sets the base unit time $t_u$ equal to 5 seconds and M equal to 5, which yields $t_m$ values of 5, 20, 80, 320, and 1280 seconds. $t_u$ equal to 5 seconds is selected based on it being a typical default reporting interval for RTCP reports in exemplary applications using RTP, and thus when RTCP reports data is integrated into the measurements system, the base time scale of MBAC and the RTCP report interval will correspond. S. Tao et al. uses $t_u$ equal to 15 seconds in their path switching application, and in another implementation, described in S. Tao et al., "Exploring the Performance Benefits of End-to-End Path Switching," in Proc. of the ICNP, October, 2004, one minute is used, but no justification is given for these selections. See also, A. Bremler-Barr et al., "Predicting and Bypassing End-to-End Internet Service Degradations," IEEE J. Selected Areas in Communications, vol. 21, no. 6, August 2003 (where one minute is also used).

For response times faster than 15 seconds and one minute, five seconds might be an appropriate choice for $t_u$. Also, the value $t_4$ equal to 320 seconds is a judicious choice as this interval approximates the values of expected call holding times of 3-5 minutes (180-300 seconds) used in many traffic engineering models. Intuitively, a historical window of this size may be a good choice for predicting the pathMOS for a call with approximately the same duration.

An abstract model for the $t_m$ selection scheme described below uses an efficiency measure that approximates Equation 4 as an input parameter to the selection scheme. Equation 4 uses a parameter $A_j$ that is not assigned a value until the completion of the $j^{th}$ call (or in the case of a rejection, until the completion time if the call had been admitted, which is a conundrum). In practice, the holding time of the $j^{th}$ call may be much larger than the average call holding time. For example, for one exemplary set of 269 calls occurring on a given day to a given office, the average call holding time was 264 seconds (4 minutes, 24 second) but the maximum call holding time was 160 minutes, and the standard deviation was 16 minutes. Therefore, to compute efficiency measures in real time using $A_j$, in some cases it may warrant waiting a long time before completing the computation.

In other words, the "lag" between the time when an efficiency measurement is needed and when it can be computed using Equation 4 may be too large for practical use. Additionally, the size of the data structure needed to compute Equation 4 grows linearly with call holding times. Hence, instead of using actual call holding times in computations of $A_j$, an exemplary implementation uses a fixed (configurable) value, $T_h$, representing the average call holding time, e.g., three minutes. For calls with holding times longer than $T_h$, after time $T_h$ has elapsed since the beginning of a call, the average MOS score for the call is computed and then used to compute $A_{j,h}$, an estimate of $A_j$, using Equation 1. As $T_h$ will also translate into the lag value between the time to switch historical data time scales and the time when the information to make the decision is available, it may make sense to set $T_h$ to a smaller value than average call holding time, e.g., one minute. Also, to simplify bookkeeping in the time scale selection algorithm described below in the following section, $T_h$ should be an integer multiple of $t_u$.

Time Scale Selection Algorithm

As noted in co-pending U.S. patent application Ser. No. 11/111,464, entitled "Method and Apparatus for Quality of Service-Based Admission Control," filed contemporaneously herewith, an exponentially-weighted averaging scheme can be used to estimate the pathMOS score $y_k$, as follows: suppose the pathMOS score computed over the $k^{th}$ time interval is some value $h_k$, then $y_k$ is estimated as:

$$y_k = \alpha h_k + (1-\alpha) y_{k-1} \quad (5)$$

where $\alpha \in [0,1]$. $\alpha$ parameterizes the weight given to the most recent sample versus the weight given to historical data. Values of $\alpha$ close to zero have a smoothing effect on sudden variations in the $h_k$ measures. In S. Tao et al., "Improving VoIP Quality Through Path Switching," to appear in IEEE INFOCOM 2005, and downloadable from www.seas.upenn.edu/~shutao/paper/infocom05.pdf, for example, $\alpha$ is set to 0.2, which was empirically chosen in a path-switching context because it gives good responsiveness without risking oscillatory behavior. In TCP implementations, exponential averaging is used to estimate round-trip time (RTT), and an $\alpha$ value of 0.1 is recommended. See, e.g., W. R. Stevens, TCP/IP Illustrated, Volume 1, Addison-Wesley, Boston, Mass. (1994).

A FIFO queue q is constructed for each path as follows. q contains objects $o_k$ which themselves contain parameter values associated with the $k^{th}$ time interval of length $t_u$, after which a pathMOS score $y_k$ is computed as in Equation 5. Each object $o_k$ has the following data attributes:

pathMOS: The value $y_k$ as in Equation 5;

futurepathMOS: The computed value $y_{k,h}$ described below in Equation 6.

The object $o_k$ is created after $y_k$ is computed at time $t_k = t_u \times k$, at which time the pathMOS attribute is assigned the value $y_k$ and $o_k$ is queued. The futurepathMOS value is the average pathMOS score during the time interval of length $T_h$ that occurs after time $t_k$, and therefore cannot be assigned a value until time $t_k + T_h$, or equivalently after the $$\left(k + \frac{T_h}{t_u}\right)^{th}$$

interval. The futurepathMOS value $y_{k,h}$ is estimated using:

$$y_{k,h} = \frac{1}{P}\sum_{i=1}^{P} y_{k+i} \quad (6)$$

where $P = T_h/t_u$ and $y_{k+i}$ is the value of the pathMOS attribute of object $o_{k+i}$. Note that in practice, $y_{k,h}$ values may be computed in constant time.

External to the queue q, the historical average pathMOS score $h_k(t_m)$ is tracked at each time scale $t_m$ as:

$$h_k(t_m) = \frac{1}{H}\sum_{i=0}^{H-1} y_{k-i} \quad (7)$$

which is computed at time $t_k$, immediately after $y_k$, the pathMOS value of $o_k$ (note that again each $h_k(t_m)$ value can be computed in constant time). If N+1 prediction is also performed, as described in U.S. Pat. application Ser. No. 11/111,464, entitled "Method and Apparatus for Quality of Service-Based Admission Control," filed contemporaneously herewith, then the values $h_{k-1}(t_m)$ and $h_{k-2}(t_m)$ must also be retained so that $\hat{h}k(t_m)$ values can be computed.

Also external to the queue q, efficiency measurements $\mu_k(t_m)$ can be tracked at each time scale $t_m$ as:

$$\mu_k(t_m) = \gamma(1 - |\theta_v(y_{k,h}) - \theta_v(h_k(t_m))|) + (1-\gamma)u_{k-1}(t_m), \quad (8)$$

where $\gamma \in [0,1]$ and where $\theta_v(\cdot)$ is a thresholding function with:

$$\theta_v(x) = 0 \text{ if } x < v; \quad (9)$$
$$= 1 \text{ if } x \geq v.$$

The efficiency measure values $\mu_k(t_m)$ are computed at time $t_k + T_h$ immediately after computation of the $y_{k,h}$ value. Hence, the efficiency measures of the MBAC algorithms associated with historical time scales $t_m$ at time $t_k$ are unknown until a lag time of $T_h$ has transpired. The $\mu_k(t_m)$ values are a practical implementation of the efficiency measure defined by Equation 4.

At time $t_k + T_h$, the current best historical time scale $t_h$ is selected as $$t_h = arg\ max\{\mu_k(t_m)\}.$$

i.e., the value of $t_m$ that maximizes the value of $\mu_k(t_m)$.

Thus, the limit of q needs to be $$\frac{t_M + T_h}{t_u}.$$

In other words, objects older than $t_M + T_h$ aren't used in any computations and can be discarded. If the example values of $t_M$ equal to 1280 seconds, $T_h$ equal to 180 seconds, and $t_u$ equal to 5 seconds are used, then the queue limit is 292 objects. This may be viewed as unnecessarily large.

There are two approaches to reducing the queue size. One is to set M equal to 4 and thereby set $t_M$ equal to 320 seconds, which still exceeds the estimated call holding time. It may be the case that a $t_M$ value of 1280 seconds will rarely be selected over smaller $t_m$ values by the time scale selection algorithm (this should be determined empirically). A second approach is to reduce the length of $T_h$ to, e.g., one minute, which reduces the queue limit size and also reduces the lag time.

If both queue limit size reduction approaches are applied, then using the example values result in a queue limit of 76 objects.

The above example assumes that future performance, i.e., the call experience, for the call requesting admission can be predicted by analyzing past performance of the path through the network over which the call will be transported. In addition, it is further assumed that the size of the time window over which historical performance data is analyzed affects the efficiency/error of the system. In other words, different time window sizes will yield different predictions. Thus, the size of the window matters, and furthermore the best window size may change due to (large-scale) changes in the underlying network. So, at any given time, the current "best" window size is used in analyzing historical data, where the "best" window size is the one that yields the best efficiency/error measure.

The above example selects the best window size from a set of discrete window sizes. At any time, the admission control system uses one window size for historical data. For each window size in the set, the efficiency measure is continually computed. Should the efficiency measure for one of the (unused) window sizes become better than the efficiency measure for the currently used window size, then the admission control system will switch to the new best window size.

Adaptive Weighting of Computed MOS

In a further variation of the present invention, it is again assumed that future performance is predicted by analyzing past performance. One method for analyzing past performance is to assign a numerical score to a set of past performance measurements. For voice-over-IP applications, there is a standard method called the E-model (ITU-T G.107) which uses measured delay and loss values to compute a call quality score, often referred to as "computed MOS". MOS is an acronym for Mean Opinion Score, which is a human subjective scoring of the quality of a voice call. Thus, computed MOS is an automatically computed approximation to MOS. The E-model computes a score R, which is a linear combination of measured and configured variables $R_0$, $I_s$, $I_e$, $I_d$, and A, e.g., $$R=(a*R_0)-(b*I_s)-(c*I_e)-(d*I_d)+A.$$

where $R_0$ is the effect of various noise values, $I_s$ includes the effect of other impairments that occur simultaneously with the voice signal, $I_e$ covers the impairments caused by different types of losses, $I_d$ represents the impairment caused by delay, and A compensates for various user conditions.—See S. Tao et al.

The weights a, b, c, and d assigned to the variables may be changed to bias certain variables and affect the value of R. A change in R may result in a better predictor of future performance. The efficiency/error feedback value may be used to adjust weight values and change the output of the admission control system, i.e., to improve the efficiency score of the system.

It is noted that the exemplary E-model is used as an example of a scoring mechanism and that any appropriate scoring mechanism may be used in practice. An alternate scoring mechanism could have similar adjustable weight values which could be changed depending on the feedback values of system efficiency/error and thereby improve the future performance predictor and hence affect/improve overall system performance.

Adaptive Weighting of Historical Data

As previously indicated, U.S. patent application Ser. No. 11/111,464, entitled "Method and Apparatus for Quality of Service-Based Admission Control," filed contemporaneously herewith, discloses an exponentially-weighted averaging scheme that estimates the pathMOS score using equation (5). Equation (5) employs a parameter $\alpha \in [0,1]$ that parameterizes the weight given to the most recent sample versus the weight given to historical data.

According to one variation of the present invention, the smoothing parameter a that regulates the bias of recent performance measurement data versus older performance measurement data is adjusted according to the value of the feedback efficiency/error measurement to improve the overall performance of the system.

Adaptive Weighting of Call Load

U.S. Pat. application Ser. No. 11/111,464, entitled "Method and Apparatus for Quality of Service-Based Admission Control," filed contemporaneously herewith, discloses a Quality-Based Admission Control (QBAC) technique that addresses the N+1 call admission problem. In one exemplary implementation that employs N+1 prediction, a test is performed to determine if a path metric $y_{k+j-1}+2\dot{y}_{k+j-1}+\beta\delta_{k+j}$ is less than or equal to a threshold, θ. If the path metric does not exceed the defined threshold 0, then the call is rejected.

The parameter β weights the value of δ, the load of the call requesting admission. According to a further variation of the present invention, the parameter β is dynamically adjusted according to the value of the feedback efficiency/error measurement to improve the overall performance of the system.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method comprising:
   receiving a first admission-control request to establish a first call by a private branch exchange;
   establishing the first call from the private branch exchange when and only when a first predictor predicts a first value of a quality of service metric for the first call, wherein the first value is above a threshold;
   receiving a second admission-control request to establish a second call by the private branch exchange;

evaluating how well the first predictor performs, wherein the evaluating comprises an efficiency measure that is based at least in part on:
(i) whether the first call was established, and
(ii) a measure of the quality of service metric of the first call;
updating a parameter of the first predictor based on the results of the evaluating, resulting in a second predictor; and
establishing the second call from the private branch exchange when and only when the second predictor predicts a second value of the quality of service metric for the second call, wherein the second value is above the threshold.

2. The method of claim 1, wherein the evaluating of the first predictor is performed for a configurable time duration.

3. The method of claim 2, wherein the configurable time duration is based on an expected call holding time.

4. The method of claim 1, wherein the first predictor is further based on a window size of historical data.

5. The method of claim 1, wherein the efficiency measure is computed for each of a plurality of potential window sizes, and the the updating comprises selecting one of the plurality of potential window sizes based on the efficiency measure.

6. The method of claim 1, wherein the first predictor is further based on a computed mean opinion score value.

7. The method of claim 1, wherein the updating comprises adjusting a weight given to recent samples relative to historical data.

8. The method of claim 1, wherein the first predictor is based on a load of a call requesting admission.

9. The method of claim 1 wherein at least one of the first call and the second call is established over an Internet Protocol network.

10. The method of claim 9 wherein at least one of the first call and the second call is a Voice over Internet Protocol call.

11. A system comprising:
a memory; and
a processor that is coupled to the memory and is operative to:
receive a first admission-control request to establish a first call by the system;
establish the first call from the system when and only when a first predictor predicts a first value of a quality of service metric for the first call, wherein the first value is above a threshold;
receive a second admission-control request to establish a second call by the system;
evaluate how well the first predictor performs, comprising calculating an efficiency measure that is based at least in part on:
(i) whether the first call was established, and
(ii) a measure of the quality of service metric of the first call;
update a parameter of the first predictor based on the results of the evaluation, resulting in a second predictor; and
establish the second call from the system when and only when the second predictor predicts a second value of the quality of service metric for the second call, wherein the second value is above the threshold.

12. The system of claim 11, wherein the processor evaluates how well the first predictor performs for a configurable time duration.

13. The system of claim 12, wherein the configurable time duration is based on an expected call holding time.

14. The system of claim 11, wherein the first predictor includes a window size of historical data.

15. The system of claim 11, wherein the processor calculates the efficiency measure for each of a plurality of potential window sizes, and further wherein the processor updates the parameter by selecting one of the plurality of potential window sizes based on the efficiency measure.

16. The system of claim 11, wherein the first predictor is further based on a computed mean opinion score value.

17. The system of claim 11, wherein the first predictor is based on historical data.

18. The system of claim 11, wherein the first predictor is based on a load of a call requesting admission.

19. The system of claim 11, wherein at least one of the first call and the second call is established over an Internet Protocol network.

20. The system of claim 19 wherein at least one of the first call and the second call is a Voice over Internet Protocol call.

21. An article of manufacture, comprising a machine readable medium containing a program that when executed implements the steps of executes:
receive a first admission-control request to establish a first call;
establish the first call when and only when a first predictor predicts a first value of a quality of service metric for the first call, wherein the first value is above a threshold;
receive a second admission-control request to establish a second call;
evaluate how well the first predictor performs, comprising calculating an efficiency measure that is based at least in part on:
(i) whether the first call was established, and
(ii) a measure of the quality of service metric of the first call;
update a parameter of the first predictor based on the results of the evaluation, resulting in a second predictor; and
establish the second call when and only when the second predictor predicts a second value of the quality of service metric for the second call, wherein the second value is above the threshold.

22. The article of manufacture of claim 21 wherein at least one of the first call and the second call is established over an Internet Protocol network.

23. The article of manufacture of claim 22 wherein at least one of the first call and the second call is a Voice over Internet Protocol call.

* * * * *